(12) United States Patent
Takahashi et al.

(10) Patent No.: US 11,169,944 B2
(45) Date of Patent: Nov. 9, 2021

(54) COMMUNICATION DEVICE, COMMUNICATION METHOD, PROGRAM, AND COMMUNICATION SYSTEM

(71) Applicant: Sony Semiconductor Solutions Corporation, Kanagawa (JP)

(72) Inventors: Hiroo Takahashi, Kanagawa (JP); Naohiro Koshisaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/618,596

(22) PCT Filed: Jun. 7, 2018

(86) PCT No.: PCT/JP2018/021806
§ 371 (c)(1),
(2) Date: Dec. 2, 2019

(87) PCT Pub. No.: WO2018/225808
PCT Pub. Date: Dec. 13, 2018

(65) Prior Publication Data
US 2020/0133904 A1     Apr. 30, 2020

(30) Foreign Application Priority Data
Jun. 8, 2017 (JP) .............................. JP2017-113852

(51) Int. Cl.
*G06F 13/36* (2006.01)
*G06F 13/362* (2006.01)
(Continued)

(52) U.S. Cl.
CPC ............ *G06F 13/362* (2013.01); *G06F 9/485* (2013.01); *G06F 11/3027* (2013.01); *G06F 13/4282* (2013.01)

(58) Field of Classification Search
CPC . G06F 9/48; G06F 11/30; G06F 13/42; G06F 13/362
See application file for complete search history.

(56) References Cited

U.S. PATENT DOCUMENTS 6,806,590 B1    10/2004    Smuk et al.
9,965,420 B2 *   5/2018    Liu ........................ G06F 13/362
(Continued)

FOREIGN PATENT DOCUMENTS

JP    2002507087 A    3/2002
WO    2001/107663 A1    12/2004
(Continued)

OTHER PUBLICATIONS

MIPI Alliance, I3c Specification version 1.0, Dec. 23, 2016 (Year: 2016).*
(Continued)

*Primary Examiner* — Henry Tsai
*Assistant Examiner* — Christopher A Daley
(74) *Attorney, Agent, or Firm* — Michael Best & Friedrich LLP

(57) ABSTRACT

To perform communication more definitely and efficiently. Communication is performed by a master that is a communication device having a communication initiative and a slave that is a communication device that performs communication under control of the master. The master assigns a group address to an arbitrary slave of a plurality of slaves joining in a bus setting a plurality of arbitrary slaves to one group and setting the group to a destination, and when it is confirmed that at least one or more slaves exit from the bus of the slaves to which the group address is assigned, the group address assigned to the remaining slaves is reset. The present technology is, for example, applicable to a bus IF.

22 Claims, 12 Drawing Sheets

(51) Int. Cl.
    *G06F 9/48*         (2006.01)
    *G06F 11/30*       (2006.01)
    *G06F 13/42*       (2006.01)

(56) References Cited

U.S. PATENT DOCUMENTS

| | | | |
|---|---|---|---|
| 10,572,439 B1* | 2/2020 | Graif | G06F 13/4234 |
| 2013/0170575 A1* | 7/2013 | Imai | H04L 7/0008 |
| | | | 375/285 |
| 2015/0339248 A1* | 11/2015 | Choi | G06F 13/36 |
| | | | 710/110 |
| 2016/0004659 A1* | 1/2016 | Otoshi | G06F 13/1642 |
| | | | 710/310 |
| 2016/0036453 A1* | 2/2016 | Frank | H03L 7/085 |
| | | | 327/156 |
| 2017/0115987 A1 | 4/2017 | Peixoto Machado Da Silva et al. | |
| 2017/0255588 A1* | 9/2017 | Pitigoi-Aron | G06F 13/364 |

FOREIGN PATENT DOCUMENTS

| | | |
|---|---|---|
| WO | 2015/145347 A1 | 10/2015 |
| WO | 2017/061330 A1 | 4/2017 |

OTHER PUBLICATIONS

European Patent Office Communication Pursuant to Article 94 (3) EPC dated Jan. 13, 2021 for corresponding European Application No. 18734645.7.
Taiwanese Office Action dated Jun. 21, 2021 for corresponding Taiwanese Application No. 11020575300.
Japanese Office Action dated Jul. 6, 2021 for corresponding Japanese Application No. 2017-113852.

\* cited by examiner

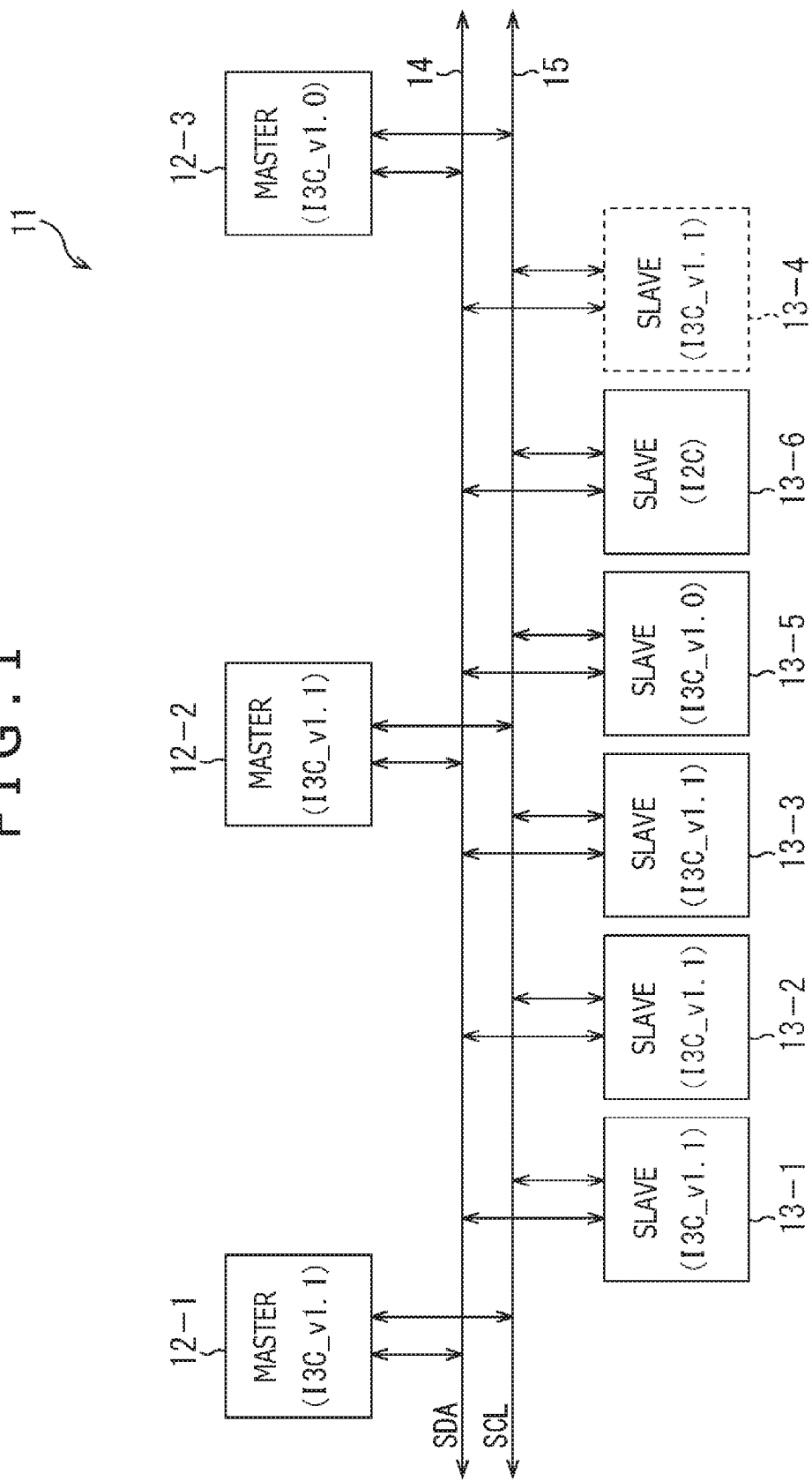

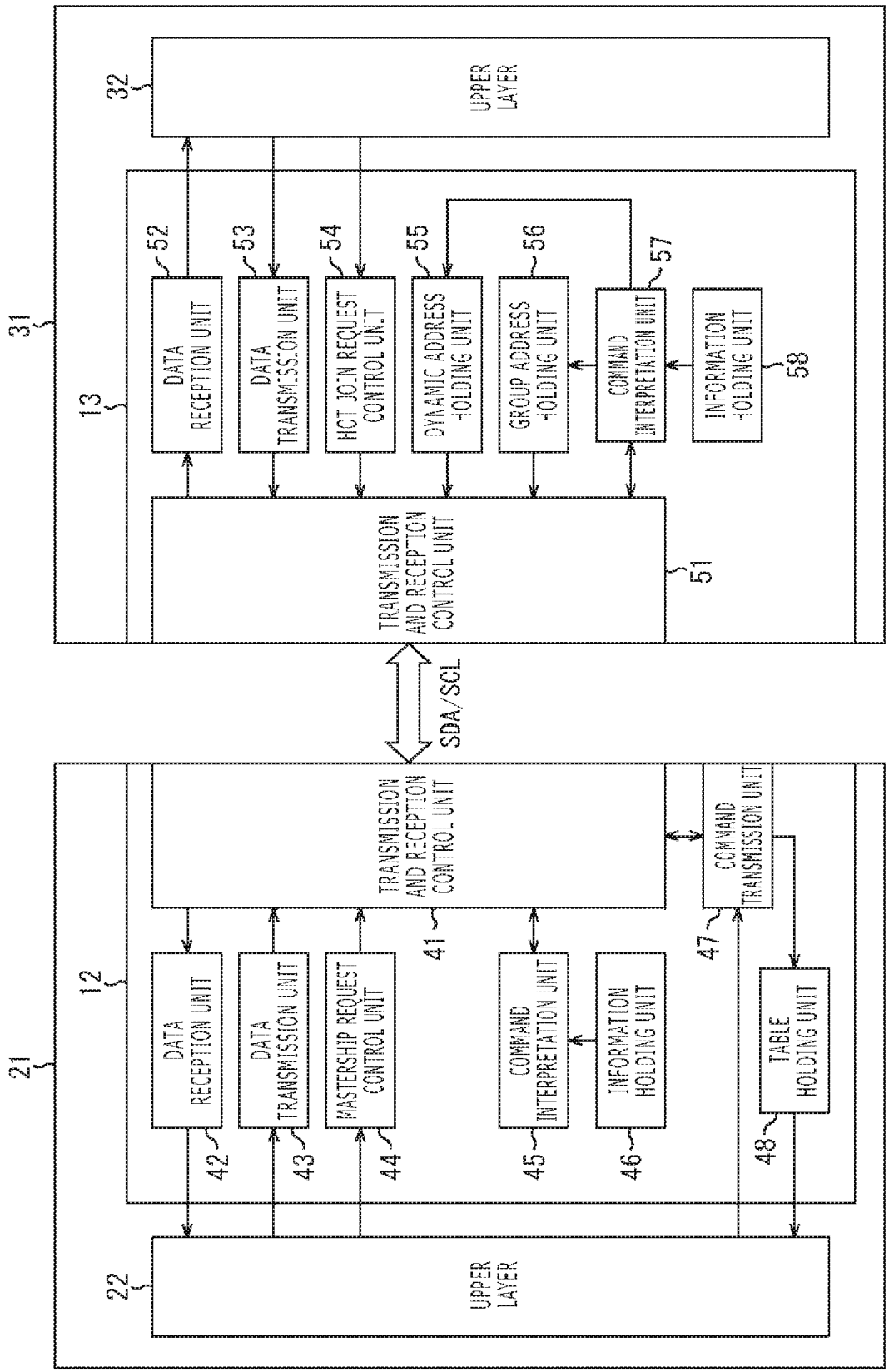

F I G . 3

A

| CURRENT MASTER | DEVICE A | | | | | | |
|---|---|---|---|---|---|---|---|
| DEVICE | FUNCTION | SA | DA | GROUP INFORMATION EFFECTIVENESS | GROUP MANAGEMENT CAPABILITY | GROUP-BELONGING-CAPABILITY | GRPA |
| A | I3C MAIN MASTER | ABSENT | DA VALUE | PRESENT | PRESENT | ABSENT | ABSENT |
| B | I3C SECONDARY MASTER | ABSENT | DA VALUE | PRESENT | PRESENT | ABSENT | ABSENT |
| C | I3C SECONDARY MASTER | ABSENT | DA VALUE | PRESENT | ABSENT | ABSENT | ABSENT |
| D | I3C SLAVE | ABSENT | DA VALUE | PRESENT | ABSENT | PRESENT | GRPA VALUE |
| E | I3C SLAVE | ABSENT | DA VALUE | PRESENT | ABSENT | PRESENT | GRPA VALUE |
| F | I3C SLAVE | SA VALUE | DA VALUE | PRESENT | ABSENT | PRESENT | GRPA VALUE |
| G | I3C SLAVE | SA VALUE | DA VALUE | PRESENT | ABSENT | ABSENT | ABSENT |
| H | I2C SLAVE | SA VALUE | ABSENT | PRESENT | ABSENT | ABSENT | ABSENT |

B

| CURRENT MASTER | DEVICE A | | |
|---|---|---|---|
| DEVICE | FUNCTION | SA | DA |
| A | I3C MAIN MASTER | ABSENT | DA VALUE |
| B | I3C SECONDARY MASTER | ABSENT | DA VALUE |
| C | I3C SECONDARY MASTER | ABSENT | DA VALUE |
| D | I3C SLAVE | ABSENT | DA VALUE |
| E | I3C SLAVE | ABSENT | DA VALUE |
| F | I3C SLAVE | SA VALUE | DA VALUE |
| G | I3C SLAVE | SA VALUE | DA VALUE |
| H | I2C SLAVE | SA VALUE | ABSENT |

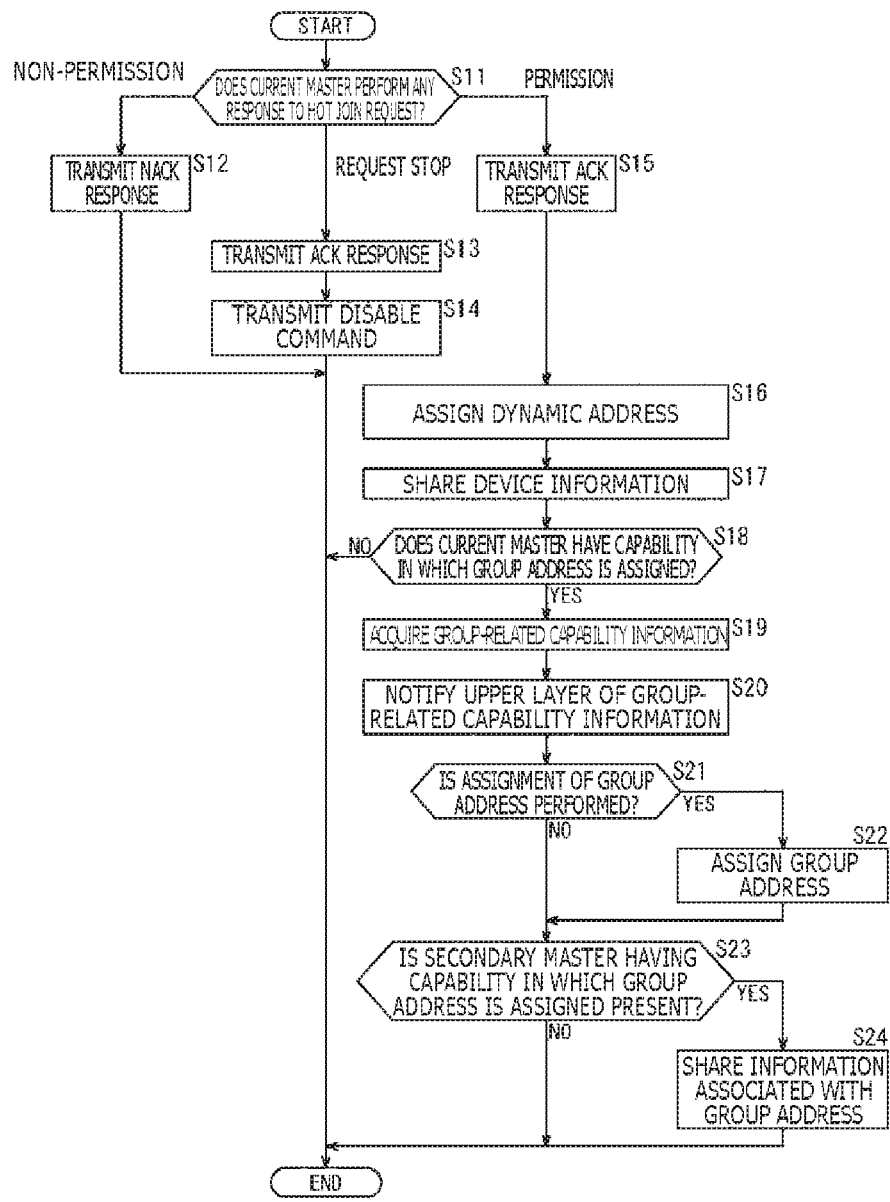

COMMUNICATION DEVICE, COMMUNICATION METHOD, PROGRAM, AND COMMUNICATION SYSTEM

TECHNICAL FIELD

The present disclosure relates to a communication device, a communication method, a program, and a communication system, and more particularly to a communication device, a communication method, a program, and a communication system aiming at enabling communication to be more definitely and efficiently performed.

BACKGROUND ART

Conventionally, a CCI (Camera Control Interface) has been widely used as a bus IF (Interface) for controlling a register in various devices and an I2C (Inter-Integrated Circuit) standard has been adopted for a physical layer in the CCI. In addition, recently, speeding up of I2C has been requested to be realized, regulations of I3C (Improved Inter Integrated Circuit) are plotted out as a next-generation standard, and a revision thereof has been promoted.

For example, I2C and I3C are configured so as to perform communication with a slave connected to the bus IF under the control by a master having a communication initiative through the bus IF. Further, in I3C, a function of maintaining compatibility so as to perform communication with a device of I2C, a function referred to as hot join capable of joining in the bus IF on the way by the slave, a function of mutually transferring a master authority between a plurality of masters, or the like is provided.

Also, in PTL 1, in I3C, an error detection method is defined so that a communication failure is avoided coming along with an error detection of a start or stop of communication or the like, and thereby a communication device capable of performing communication more definitely is disclosed.

CITATION LIST

Patent Literature

PTL 1: PCT Patent Publication No. WO2017/061330

SUMMARY OF INVENTION

Technical Problem

Meanwhile, in a current standard of I3C. it is regulated that communication is performed setting to a destination all the devices connected to the bus IF and communication is performed setting to a destination a single arbitrary device connected to the bus IF.

Therefore, for example, when a write of the same contents is desired to be performed in a plurality of arbitrary devices connected to the bus IF, a master has to repeatedly perform a write transfer individually to their devices. Accordingly, in order to enable communication to be efficiently performed, it is considered that a method for performing communication setting to a destination a plurality of arbitrary devices is established. Then, it is necessary to avoid a communication error concerned to occur accompanying a performance of communication by such a method and to definitely perform communication.

The present disclosure has been made in view of the circumstances as described above and aims at enabling communication to be more definitely and efficiently performed.

Solution to Problem

According to an aspect of the present disclosure, there is provided a communication device having a communication initiative through a bus, including: a transmission and reception control unit configured to control transmission and reception of a signal with another communication device that performs communication under control of the communication device; and a processing execution unit configured to execute a process for assigning a group address to another arbitrary communication device of a plurality of the other communication devices joining in the bus setting a plurality of the other arbitrary communication devices to one group and setting the group to a destination, and a process for resetting the group address assigned to the other remaining communication devices of the other communication devices to which the group address is assigned when it is confirmed that at least one or more of the other communication devices exit from the bus.

According to an aspect of the present disclosure, there is provided a communication method performed by a communication device having a communication initiative through a bus, or a program for causing a computer built in a communication device having a communication initiative through a bus to execute a process, the communication method or the process including the steps of: controlling transmission and reception of a signal with another communication device that performs communication under control of the communication device; assigning a group address to another arbitrary communication device of a plurality of the other communication devices joining in the bus setting a plurality of the other arbitrary communication devices to one group and setting the group to a destination; and resetting the group address assigned to the other remaining communication devices of the other communication devices to which the group address is assigned when it is confirmed that at least one or more of the other communication devices exit from the bus.

According to an aspect of the present disclosure, there is provided a communication system in which communication is performed by a communication device having a communication initiative through a bus and another communication device performing communication under control of the communication device, in which the communication device includes: a transmission and reception control unit configured to control transmission and reception of a signal with another communication device that performs communication under control of the communication device; and a processing execution unit configured to execute a process for assigning a group address to another arbitrary communication device of a plurality of the other communication devices joining in the bus setting a plurality of the other arbitrary communication devices to one group and setting the group to a destination, and a process for resetting the group address assigned to the other remaining communication devices of the other communication devices to which the group address is assigned when it is confirmed that at least one or more of the other communication devices exit from the bus.

According to an aspect of the present disclosure, transmission and reception of a signal with another communication device that performs communication under control of the communication device is controlled; a group address is assigned to another arbitrary communication device of a plurality of the other communication devices joining in the bus setting a plurality of the other arbitrary communication devices to one group and setting the group to a destination; and the group address assigned to the other remaining communication devices of the other communication devices to which the group address is assigned is reset when it is confirmed that at least one or more of the other communication devices exit from the bus.

Advantageous Effects of Invention

According to an aspect of the present disclosure, communication can be performed more definitely and efficiently.

Note that effects here described are not necessarily limited and may be any effect described in the present disclosure.

BRIEF DESCRIPTION OF DRAWINGS

FIG. 1 is a block diagram illustrating a configuration example of an embodiment of a bus IF to which the present technology is applied.

FIG. 2 is a block diagram illustrating a configuration example of a master and a slave.

FIG. 3 is a diagram illustrating an example of a table in which device information is registered.

FIG. 4 is a flowchart describing a process performed at the time of receiving a hot join request.

DESCRIPTION OF EMBODIMENT

Figure 5:
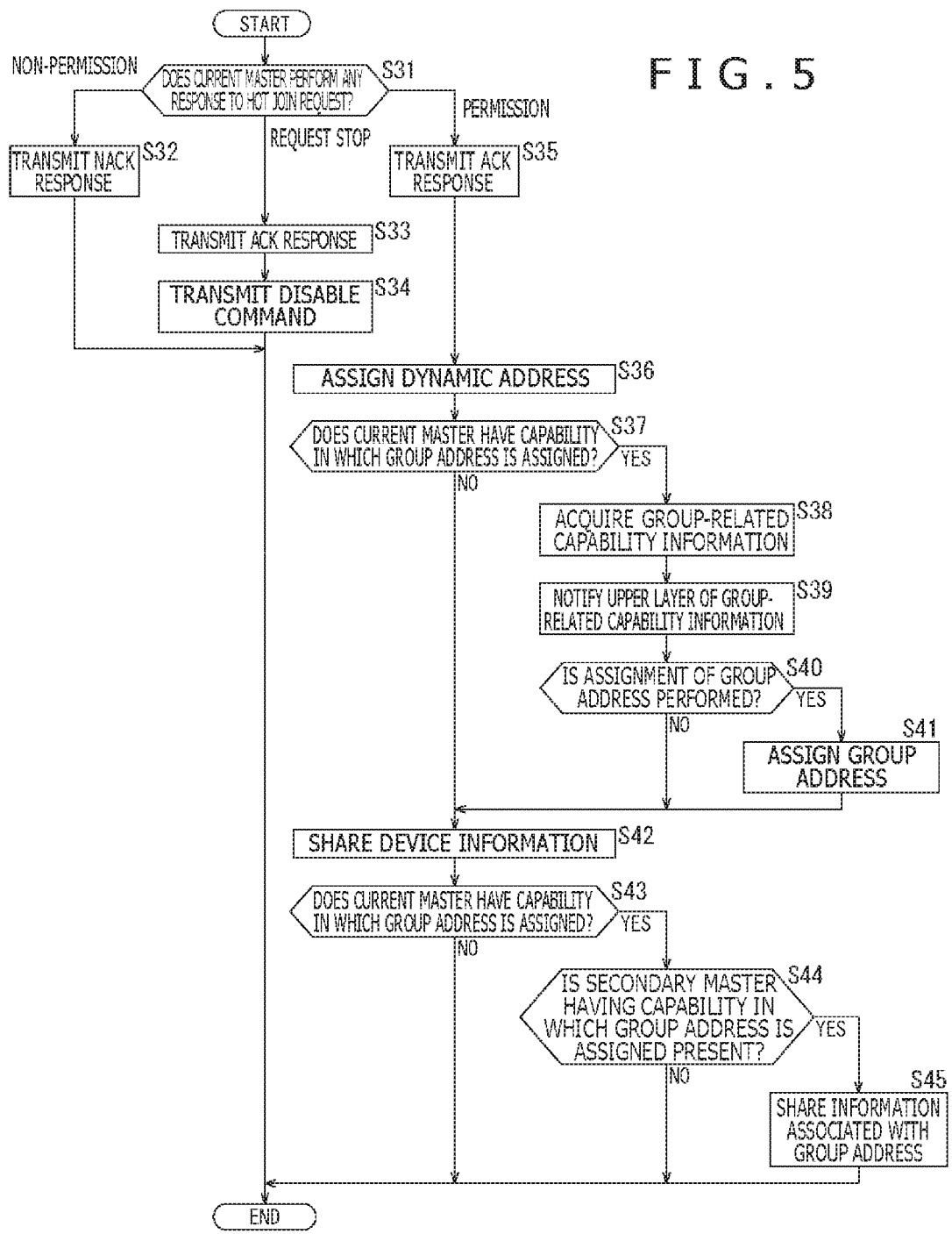
FIG. 5 is a flowchart describing a modification of the process performed at the time of receiving the hot join request.

Hereinafter, a specific embodiment to which the present technology is applied will be described in detail with reference to the accompanying drawings.

<Configuration Example of Bus IF>

FIG. 1 is a block diagram illustrating a configuration example of an embodiment of a bus IF to which the present technology is applied.

In the bus IF 11 illustrated in FIG. 1, three masters 12-1 to 12-3 and six slaves 13-1 to 13-6 are connected through a data signal line 14 for transmitting serial data SDA and a clock signal line 15 for transmitting a serial clock SCL.

The masters 12-1 and 12-2 and the slaves 13-1 to 13-4 conform to the standard (I3C_v1.1) of I3C of a newly proposed version. Also, the master 12-3 and the slave 13-5 conform to the standard (I3C_v1.0) of I3C of a current version, and the slave 13-6 conforms to the standard of I2C. As described above, even if the devices conforming to I3C_v1.1, the devices conforming to I3C_v1.0, and the device conforming to the standard of I2C are mixed, the bus IF 11 is configured so as to be operated.

In addition, in I3C, hot join that is a function capable of joining in the bus IF 11 in a state of being operated on the way is regulated. The slave 13-4 illustrated in FIG. 1 by a broken line indicates, for example, a state in which the slave 13-4 is powered off and does not join in the bus IF 11. After power-on, the slave 13-4 can transmit a hot join request and join in the bus IF 11.

The masters 12-1 to 12-3 include a function of vigorously controlling communication through the bus IF 11 and the slaves 13-1 to 13-6 can perform communication through the bus IF 11 under the control of a single master having the initiative of the masters 12-1 to 12-3. Note that, hereinafter appropriately, when the masters 12-1 to 12-3 do not need to be differentiated, they are simply referred to as the masters 12, whereas when the slaves 13-1 to 13-6 do not need to be differentiated, they are simply referred to as the slaves 13.

In addition, from among the masters 12-1 to 12-3, one master 12 having the communication initiative (hereinafter, referred to as a master authority) in the bus IF 11 is referred to as a current master 12C and the other masters 12 are referred to as a secondary master 12S. For example, the secondary master 12S having no master authority can perform communication through the bus IF 11 under the control of the current master 12C, and when the master authority is transferred from the current master 12C, the secondary master 12S functions as the current master 12C. As described above, the master 12 functions as the current master 12C in the state of having the communication initiative and the secondary master 12S in the state of having no communication initiative is treated in the similar manner as in the slave 13. Accordingly, in the present embodiment, also the secondary master 12S that performs communication under control of the current master 12C will be described being included in the slave 13.

Here, hereinafter appropriately, the slaves 13-1 to 13-4 conforming to I3C_v1.1 and the slave 13-5 conforming to I3C_v1.0 are also referred to as I3C slave 13. Further, the devices (that is, the master 12 and the I3C slave 13) conforming to any of I3C_v1.1 and I3C_v1.0 are also referred to as the I3C device.

Meanwhile, in I3C_v1.1, setting a plurality of arbitrary I3C slaves 13 to a destination, the current master 12C is examined to set and operate a group address that enables a write transfer to be concurrently performed to their I3C slaves 13.

By defining a SETGRPA command, the same group address is set to a plurality of I3C slaves 13 belonging to the same group. For example, by setting the dynamic address for each group, the dynamic address can be used as the group address. Note that a single I3C slave 13 can belong to a plurality of groups and at least one or more of group addresses can be assigned to the single I3C slave 13.

For example, the current master 12C sets the group address to respective groups by using the SETGRPA command. Then, on the occasion of performing various types of write transfers (Direct Write CCC/Private Write/HDR Write) regulated by I3C, the current master 12C designates the group address to a slave address field of the command of the write transfer. Through this process, the current master 12C can concurrently write data in a plurality of I3C slaves 13 belonging to the group by a onetime write transfer.

Meanwhile, the I3C slave 13 receives communication relating to an address 7'h7E for designating all the I3C slaves 13 joining in the bus IF 11, the dynamic address of the I3C slave 13 itself, or the group address to which the I3C slave 13 itself belongs and executes processing according to contents of the communication.

Figure 9:
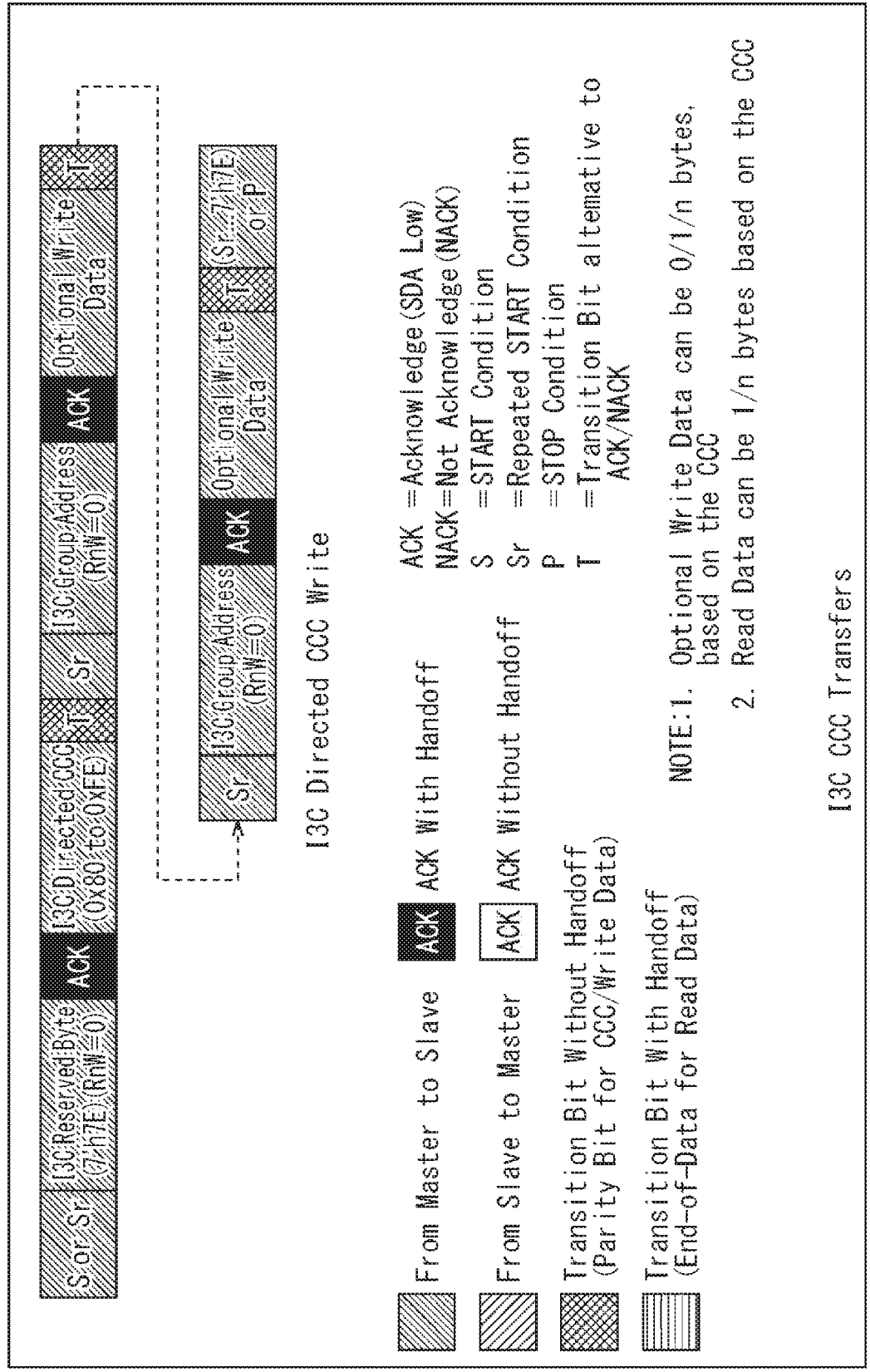
FIG. 9 is a diagram illustrating an example of a communication format in a write transfer.
Figure 11:
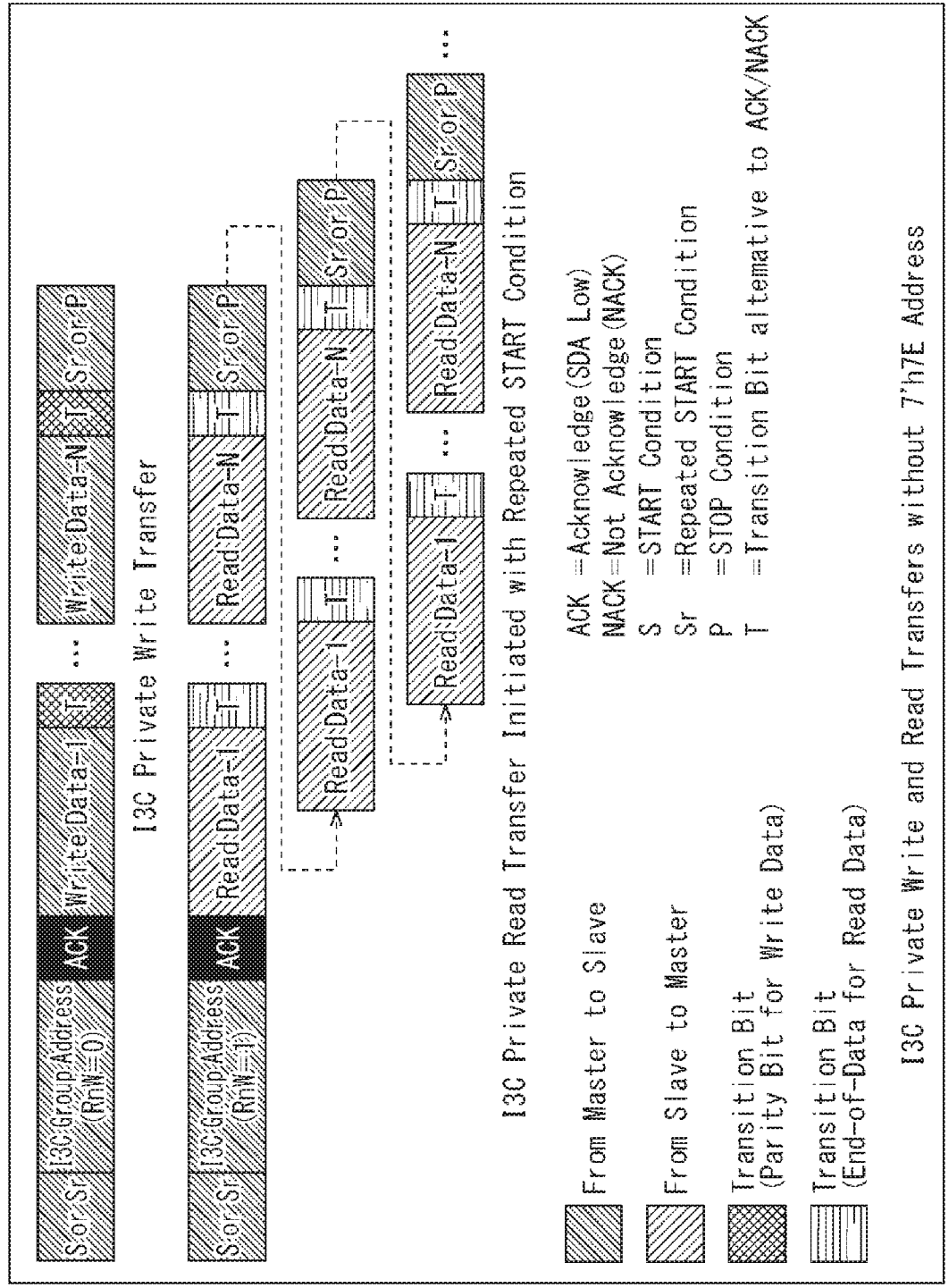
FIG. 11 is a diagram illustrating an example of the communication format in the write transfer and the readout transfer.

In addition, when the current master 12C performs designation using the group address and transmits the readout command to the plurality of I3C slaves 13, the readout data transferred from the plurality of I3C slaves 13 is estimated to conflict. Therefore, an operation is assumed in which on the occasion of performing various types of readout transfer (Direct Read CCC/Private Read/HDR Read) regulated by I3C, the group address is prohibited to be designated to a slave address field of the command of the readout transfer. Note that, as illustrated in FIG. 9 and FIG. 11 to be described below, when a timing at which the readout data is output for each of the plurality of I3C slaves 13 is controlled, the conflict of the readout data can be avoided. In this case, on the occasion of performing various types of readout transfer, the bus IF 11 can be operated without prohibiting designating the group address. Further, a register etc. may be installed to enable the readout transfer in which the group address is designated.

Meanwhile, the bus IF 11 illustrated in FIG. 1 is formed as a mixture of the masters 12-1 and 12-2 and I3C slaves 13-1 to 13-4 conforming to I3C_v1.1 in which a function relating to the group address is regulated, the master 12-3 and I3C slave 13-5 conforming to I3C_v1.0 in which the function relating to the group address is not regulated, and the I2C slave 13-6 conforming to the standard of I2C.

In the bus IF 11 configured as described above, in order to perform an assignment of the group address through the masters 12-1 and 12-2, I3C_v1.1 needs to be regulated so as to recognize the I3C device corresponding to the group address of all the masters 12 and slaves 13 joining in the bus IF 11.

In addition, when a plurality of masters 12 joining in the bus IF 11 correspond to the group address. I3C_v1.1 needs to be regulated so that those masters 12 can mutually recognize the group address to which the other masters 12 assign. That is, there is a concern that when some masters 12 cannot recognize the group address assigned by the other masters 12, an already used address value has been used for the group address and a communication error occurs. In addition, there is a concern that the group address set by some masters 12 is rewritten by the other masters 12, and thereby group address information is broken and the communication error occurs.

In order to solve the problems, when operating the group address, the masters 12-1 and 12-2 conforming to I3C_v1.1 are configured so that a corresponding state to the group address can be recognized and the communication error concerned to occur due to the usage of the group address can be avoided. This process permits the communication error to be definitely avoided and communication to be efficiently performed using the group address in the bus IF 11.

<Configuration Example of Master and Slave>

FIG. 2 is a block diagram illustrating a configuration example of the master 12 and the slave 13.

In a configuration illustrated in FIG. 2, the master 12 is incorporated as a physical layer of the master device 21 and the master device 21 includes an upper layer 22 (for example, a CCI layer) that is in an upper position to the master 12. In the similar manner, the slave 13 is incorporated as a physical layer of the slave device 31 and the slave device 31 includes an upper layer 32 (for example, a CCI layer) that is in an upper position to the slave 13.

As illustrated in FIG. 2, the master 12 includes a transmission and reception control unit 41, a data reception unit 42, a data transmission unit 43, a mastership request control unit 44, a command interpretation unit 45, an information holding unit 46, a command transmission unit 47, and a table holding unit 48. Note that each unit or a portion of these units may be realized, for example, by using a semiconductor integrated circuit, a programmable semiconductor integrated circuit, software, or the like.

The transmission and reception control unit 41 controls transmission and reception of signals with the other devices connected to the bus IF 11. For example, the transmission and reception control unit 41 drives the clock signal line 15, transmits the serial clock SCL, and drives the data signal line 14 in accordance with a timing of the serial clock SCL, and thereby controls transmission of the serial data SDA to the other devices. In addition, in accordance with the timing of the serial clock SCL, the transmission and reception control unit 41 controls the reception of the serial data SDA that is transmitted by driving the data signal line 14 through the other devices.

Under the control of the transmission and reception control unit 41, the data reception unit 42 receives data transmitted from the other devices and supplies the data to the upper layer 22.

Under the control of the transmission and reception control unit 41, the data transmission unit 43 transmits the data supplied from the upper layer 22 to the other devices.

In accordance with a request from the upper layer 22, when the master 12 is the secondary master 12S, the mastership request control unit 44 performs control relating to transmission of a mastership request for requesting the master authority to be transferred from the current master 12C.

The command interpretation unit 45 performs an interpretation of the command received under the control of the transmission and reception control unit 41 and executes processing according to the command with reference to various types of information held by the information holding unit 46.

The information holding unit 46 can hold various types of information required for executing processing according to the command through the command interpretation unit 45. In the information holding unit 46, for example, there is held group-related capability information that is a capability relating to the group and is information indicating a capability included in the master 12 itself. For example, when the master 12 itself has a capability (hereinafter, also referred to as a group management capability) for assigning the group address, the group-related capability information indicating that the group management capability is included is held by the information holding unit 46.

In accordance with the request from the upper layer 22, the command transmission unit 47 transmits the command through the bus IF 11 under the control of the transmission and reception control unit 41. In addition, in accordance with the command transmitted from the master 12, for example, the command transmission unit 47 supplies the group-related capability information transmitted from the device joining in the bus IF 11 to the table holding unit 48.

The table holding unit 48 holds a device information table (refer to FIG. 3 to be described below) in which the device information associated with respective devices is registered, while associated to all the devices joining in the bus IF 11. In the device information table, for example, the device information including the group-related capability information, the group address, or the like is registered, while associated to a device ID (Identification) that identifies the device. Then, the table holding unit 48 holds the group-related capability information of each device supplied from the command transmission unit 47 in the device information table, and at the same time notifies also the upper layer 22 of the group-related capability information.

The slave 13 includes a transmission and reception control unit 51, a data reception unit 52, a data transmission unit 53, a hot join request control unit 54, a dynamic address holding unit 55, a group address holding unit 56, a command interpretation unit 57, and an information holding unit 58. Note that each unit or a portion of these units may be realized, for example, by using a semiconductor integrated circuit, a programmable semiconductor integrated circuit, software, or the like.

The transmission and reception control unit 51 controls transmission and reception of signals with the other devices connected to the bus IF 11. For example, in accordance with the timing of the serial clock SCL, the transmission and reception control unit 51 controls reception of the serial data SDA transmitted by driving the data signal line 14 through the other devices. Also, in accordance with the timing of the serial clock SCL, the transmission and reception control unit 51 drives the data signal line 14 and thereby controls transmission of the serial data SDA to the other devices.

Under the control of the transmission and reception control unit 41, the data reception unit 52 receives data transmitted from the other devices and supplies the data to the upper layer 32.

Under the control of the transmission and reception control unit 41, the data transmission unit 53 transmits the data supplied from the upper layer 32 to the other devices.

The hot join request control unit 54 performs, for example, control relating to the transmission of the hot join request for requesting the slave 13 in the state of not joining in the bus IF 11 to join in the bus IF 11 in the operating state.

The dynamic address holding unit 55 can hold the dynamic address assigned to the slave 13 and appropriately holds the dynamic address in accordance with an instruction by the command interpretation unit 57.

The group address holding unit 56 can hold the group address assigned to the slave 13 and appropriately holds the group address in accordance with the instruction by the command interpretation unit 57.

The command interpretation unit 57 performs an interpretation of the command received under the control of the transmission and reception control unit 51, refers to various types of information held by the information holding unit 58, and executes processing according to the command.

The information holding unit 58 can hold various types of information required for executing processing according to the command through the command interpretation unit 57. In the information holding unit 58, for example, there is held the group-related capability information that is information indicating a capability that relates to the group and is included in the slave 13 itself. For example, when the slave 13 itself has the capability (hereinafter, also referred to as a group-belonging capability) to which the group address is assigned, the group-related capability information indicating that the group-belonging capability is included is held by the information holding unit 58.

Here, the device information table held by the table holding unit 48 will be described with reference to FIG. 3. In FIG. 3A, an example of the device information table held by the table holding unit 48 of the masters 12-1 and 12-2 conforming to I3C_v1.1 is illustrated and in FIG. 3B, an example of the device information table held by the table holding unit 48 of the master 12-3 conforming to I3C_v1.0 is illustrated.

As illustrated in FIG. 3A, in the device information table of I3C_v1.1, the device ID (in an example of FIG. 3, the device ID: A to H) identifying all the devices joining in the bus IF 11 is registered. Then, while associated to respective device IDs, function information, a static address (SA), the dynamic address (DA), group information effective information, group management capability information, group-belonging capability information, and a group address (GRPA) are registered as the device information. In addition, in this device information table, the device ID (in an example of FIG. 3, the device ID: A) of the master 12 that is the current master 12C is registered.

In the function information, the device information indicating functions included in the device joining in the bus IF 11 is registered and, for example, the device information indicating any of an I3C main master, an I3C secondary master, an I3C slave, and an I2C slave is registered.

In the static address, the address value (SA value) indicating the static address included in the device is registered as the device information, and in addition thereto, the device information (none) indicating the fact is registered with regard to the device having no static address.

In the dynamic address, the address value (DA value) indicating the dynamic address assigned to the device is registered as the device information, and in addition thereto, the device information (none) indicating the fact is registered with regard to the device (I2C device) incapable of having the dynamic address. In addition, when the dynamic address can be included but the dynamic address is not yet assigned, the device information (not yet) indicating the fact is registered in the dynamic address.

In the group information effective information, the device information (present) indicating that the device information registered in the group management capability information, the group-belonging capability information, and the group address is effective or the device information (absent) indicating that their device information is not yet acquired is registered.

In the group management capability information, the device information (present) indicating that the device has a capability to which the group address is assigned or the device information (absent) indicating that the device has no capability to which the group address is assigned is registered. In addition, with regard to the device in which the group management capability information is not acquired, the group management capability information is left blank.

In the group-belonging capability information, the device information (present) indicating that the device has a capability to which the group address is assigned or the device information (absent) indicating that the device has no capability to which the group address is assigned is registered. In addition, with regard to the device in which the group-belonging capability information is not acquired, the group-belonging capability information is left blank.

In the group address, the address value (GRPA value) indicating the group address assigned to a group to which the device belongs is registered as the device information. In addition, with regard to the device (the I2C device, the I3C device having no group-belonging capability information, or the like) having no stress in which the group address is assigned, the device information (absent) indicating the fact is registered. Further, in the group address, when the device has the stress in which the group address is assigned but the group address is not yet assigned to the device, the device information (not yet) indicating the fact is registered. Also, with regard to the device in which the group address is not acquired, the group address is left blank.

Also, as illustrated in FIG. 3B, in the device information table of I3C_v1.0, the function information, the static address (SA), and the dynamic address (DA) are registered as the device information from among the device information sets registered in the device information table of I3C_v1.1 while associated with the respective device IDs. That is, in I3C_v1.0, since the group address is not defined, the group information effective information, the group management capability information, the group-belonging capability information, and the group address are not registered in the device information table.

As described above, in the table holding unit 48, there is held the device information table in which an assignment state and the like of the static address, the dynamic address, or the group address are registered.

<Process at the Time of Receiving Hot Join Request>

The process performed at the time when the current master 12C receives the hot join request will be described with reference to a flowchart illustrated in FIG. 4.

For example, when the current master 12C receives the hot join request transmitted by the I3C device that has performed the hot join, the process starts. In Step S11, it is determined whether the current master 12C performs any response of non-permission, a request stop, and permission to the hot join request.

For example, in a state in which the hot join request cannot be received, in Step S11, it is determined that the current master 12C performs the response of non-permission to the hot join request and the process advances to Step S12. In Step S12, the current master 12C transmits a NACK response and the process ends.

Alternatively, when the hot join request cannot be received and the request is stopped, in Step S1, it is determined that the current master 12C performs the response of request stop to the hot join request and the process advances to Step S13. Then, in Step S13, the current master 12C transmits the ACK response, in Step S14, transmits a disable command for prohibiting the hot join request from being issued and the process ends.

On the other hand, in a state in which the hot join request can be received, in Step S11, it is determined that the current master 12C performs the response of permission to the hot join request and the process advances to Step S15.

In Step S15, the current master 12C transmits the ACK response, and then in Step S16, executes an ENTDAA command sequence for instructing the dynamic address to be assigned to the I3C device. In accordance with the above, when the dynamic address is assigned to the I3C device that has requested the hot join request, the process advances to Step S17.

In Step S17, the current master 12C transmits a DEFSLVS command for instructing the device information to be shared to all the secondary masters 12S joining in the bus IF 11. This process permits the current master 12C to share the device information associated with the I3C device that has requested the hot join request with the secondary masters 12S. Note that, at this time point, since the process relating to the group address is not executed, in the device information shared in Step S17, the device ID, the function information, the static address, and the dynamic address are included of the device information registered in the table illustrated in FIG. 3 to be described above. Note that the DEFSLVS command may be expanded and information associated with the group address (that is, the group management capability information, the group-belonging capability information, and the group address of FIG. 3) may be enabled to be acquired as the device information of the I3C device at this stage.

In Step S18, the current master 12C refers to the group-related capability information held by the information holding unit 46 and determines whether or not the current master 12C itself has the capability in which the group address is assigned.

In Step S18, when it is determined that the current master 12C has no capability in which the group address is assigned, the process ends. For example, when the current master 12C is the master 12-3 conforming to I3C_v1.0, the current master 12C has no capability in which the group address is assigned. In addition, in I3C_v1.1, when the capability in which the group address is assigned is regulated to be an option and the capability is not set to the master 12-1 or 12-2 that is the current master 12C, it is determined that the current master 12C has no capability in which the group address is assigned.

On the other hand, in Step S18, when it is determined that the current master 12C has the capability in which the group address is assigned, the process advances to Step S19. Note that when the current master 12C and the secondary master 12S are regulated to necessarily have the group management capability, the process of Step S18 may be omitted; then, Step S18 is skipped and the process advances to Step S19.

In Step S19, the current master 12C transmits the GET-GRPCAP command for instructing a transmission of the group-related capability information to be requested to the I3C device that has requested the hot join request. In accordance with the above, when the current master 12C acquires the group-related capability information transmitted by the I3C device, the process advances to Step S20. That is, the current master 12C acquires the group-related capability information associated with the I3C device that has requested the hot join request to thereby recognize whether or not the I3C device has the group-belonging capability.

In Step S20, the current master 12C notifies the upper layer 22 of FIG. 2 of the group-related capability information acquired in Step S19. This process permits the upper layer 22 to grasp a correspondence of the I3C device to the group address and the upper layer 22 to determine the group address to be assigned to the I3C device.

In Step S21, it is determined whether or not the current master 12C performs the assignment of the group address to the I3C device. For example, when the assignment of the group address is instructed by the upper layer 22 that has performed a determination on the basis of the group-related capability information, it can be determined that the current master 12C assigns the group address to the I3C device in accordance with the instruction.

In Step S21, when it is determined that the current master 12C performs the assignment of the group address, the process advances to Step S22. In Step S22, the current master 12C transmits the SETGRPA command for instructing the group address to be assigned and assigns the group address to the I3C device in accordance with the instruction from the upper layer 22. That is, when it is recognized that the I3C device that has requested the hot join request has the group-belonging capability, the current master 12C can assign the group address to the I3C device.

On the other hand, in Step S21, when it is determined that the current master 12C does not perform the assignment of the group address or after the process of Step S22, the process advances to Step S23.

In Step S23, the current master 12C refers to the device information table held by the table holding unit 48 and determines whether or not the secondary master 12S having the capability in which the group address is assigned is present other than the current master 12C.

In Step S23, when the current master 12C determines that the secondary master 12S having the capability in which the group address is assigned is present, the process advances to Step S24. Note that when the current master 12C and the secondary master 12S are regulated to necessarily have the group management capability, the process of Step S23 may be omitted; then, Step S23 is skipped and the process advances to Step S24.

In Step S24, the current master 12C transmits the DEFGRPS command for instructing the information associated with the group address to be shared to the secondary master 12S having the capability in which the group address is assigned. Through this process, the current master 12C shares the information associated with the group address of the I3C device that has requested the hot join request with the secondary master 12S having the capability in which the group address is assigned. For example, the current master 12C shares the group management capability information and the group-belonging capability information with respective devices joining in the bus IF 11. Further, in Step S22, when the group address is assigned to the I3C slave 13, the current master 12C shares the group address.

In Step S23, when the current master 12C determines that the secondary master 12S having the capability in which the group address is assigned is not present or after the process of Step S24, the process ends.

As described above, the current master 12C acquires the group-related capability information associated with the I3C device that has requested the hot join request to thereby recognize whether or not the I3C device has the group-belonging capability. This process permits the current master 12C to definitely assign the group address to the I3C device having the group-belonging capability. Further, with the secondary master 12S having the group management capability, the current master 12C can share the information associated with the group address of the I3C device that has requested the hot join request.

As described above, when the I3C device has requested the hot join request, the information associated with the group address is shared and thereby all the masters 12 can recognize the group address of the I3C device in the bus IF 11. Through this process, for example, the address value that is already used by another master 12 is newly used as the group address to thereby avoid a situation in which a communication error occurs. In addition, the information associated with the group address is shared and in the bus IF 11, for example, the group address to which another master 12 sets is rewritten to thereby avoid a situation in which a communication error occurs. Accordingly, in the bus IF 11, the communication error does not occur and communication can be more definitely and efficiently performed by using the group address.

Note that the process executed at the time when the current master 12C receives the hot join request is not limited to a procedure as described with reference to FIG. 4 and other procedures may be adopted.

For example, the current master 12C may assign the dynamic address and the group address at the time of receiving the hot join request by a procedure as illustrated in FIG. 5.

That is, in a flowchart illustrated in FIG. 5, in Steps S31 to S36, the similar processes as those of Step S11 to Step S16 of FIG. 4 are executed. Then, in Step S37, the current master 12C refers to the group-related capability information held by the information holding unit 46 and determines whether or not the current master 12C itself has the capability in which the group address is assigned.

In Step S37, when it is determined that the current master 12C has the capability in which the group address is assigned, in Steps S38 to S41, the similar processes as those of Steps S19 to S21 of FIG. 4 are executed and then the process advances to Step S42. Alternatively, in Step S37, when it is determined that the current master 12C has no capability in which the group address is assigned, the process advances to Step S42. Note that when the current master 12C and the secondary master 12S are regulated to necessarily have the group management capability, the process of Step S37 may be omitted; then, Step S37 is skipped and the process advances to Step S38.

In Step S42, the current master 12C transmits the DEFSLVS command for instructing the device information to be shared to all the secondary masters 12S joining in the bus IF 11. Through this process, the current master 12C shares the device information associated with the I3C device that has requested the hot join request with the secondary masters 12S. In the device information shared in Step S42, the device ID, the function information, the static address, and the dynamic address are included of the device information registered in the table illustrated in FIG. 3 to be described above.

Subsequently, in Step S43, the current master 12C refers to the group-related capability information held by the information holding unit 46 and determines whether or not the current master 12C itself has the capability in which the group address is assigned. Note that when the current master 12C and the secondary master 12S are regulated to necessarily have the group management capability, the processes of Steps S43 and S44 may be omitted; then, Steps S43 and S44 are skipped and the process advances to Step S45.

In Step S43, when it is determined that the current master 12C has no capability in which the group address is assigned, the process ends. On the other hand, in Step S43, when it is determined that the current master 12C has the capability in which the group address is assigned, in Steps S44 and S45, the similar processes as those of Steps S23 and S24 of FIG. 4 are executed and then the process ends.

In the bus IF 11, the group address may be shared by the procedure to be described above.

<Process at the Time when I3C Device Exits>

For example, when the current master 12C confirms that the I3C device exits, the process starts; then, in Step S51, the current master 12C refers to the group-related capability information held by the information holding unit 46 and determines whether or not the current master 12C itself has the capability in which the group address is assigned.

In Step S51, when it is determined that the current master 12C has the capability in which the group address is assigned, the process advances to Step S52. Note that when the current master 12C and the secondary master 12S are regulated to necessarily have the group management capability, the process of Step S51 may be omitted and the process starts from Step S52.

In Step S52, from the device information table of FIG. 3, the current master 12C deletes the group-related capability information (the group information effective information, the group management capability information, the group-belonging capability information, and the group address) about the I3C device the exit of which is confirmed.

In Step S53, the current master 12C notifies the upper layer 22 of FIG. 2 of the group-related capability information deleted in Step S52. This process permits the upper layer 22 to determine whether or not a change in the group address is performed as a whole in accordance with the deletion of the group-related capability information.

In Step S54, it is determined whether or not the current master 12C performs the change in the group address of the I3C devices remaining in the bus IF 11. For example, when the change in the group address is instructed by the upper layer 22 that has performed the determination in accordance with the deletion of the group-related capability information, it can be determined that the current master 12C performs the change in the group address of the I3C device in accordance with the instruction.

In Step S54, when it is determined that the current master 12C performs the change in the group address of the I3C devices remaining in the bus IF 11, the process advances to Step S55. In Step S55, the current master 12C assigns the group address by using the SETGRPA command or resets the group address by using the RSTGRPA command to be described below with reference to FIG. 7 or FIG. 8. That is, the group address assigned to the I3C devices remaining in the bus IF 11 is re-set or reset.

On the other hand, in Step S54, when it is determined that the current master 12C does not perform the change in the group address or after the process of Step S55, the process advances to Step S56.

In Step S56, the current master 12C refers to the device information table held by the table holding unit 48 and determines whether or not the secondary master 12S having the capability in which the group address is assigned is present other than the current master 12C.

In Step S56, when the current master 12C determines that the secondary master 12S having the capability in which the group address is assigned is present, the process advances to Step S57. Note that when the current master 12C and the secondary master 12S are regulated to necessarily have the group management capability, the process of Step S56 may be omitted; then, Step S56 is skipped and the process advances to Step S57.

In Step S57, the current master 12C transmits the DEFGRPS command for instructing the information associated with the group address to be shared to the secondary master 12S having the capability in which the group address is assigned. Through this process, the current master 12C shares the information associated with the group address in which the assignment or reset is performed in Step S55 with the secondary master 12S having the capability in which the group address is assigned.

In Step S56, when the current master 12C determines that the secondary master 12S having the capability in which the group address is assigned is not present or after the process of Step S57, the process advances to Step S58. In addition, in Step S51, even when it is determined that the current master 12C has no capability in which the group address is assigned, the process advances to Step S58.

In Step S58, from the device information table of FIG. 3, the current master 12C deletes the address information (the static address and the dynamic address) about the I3C device the exit of which is confirmed. Note that the current master 12C does not delete the address information associated with the I3C device the exit of which is confirmed and may invalidate the address information.

In Step S59, the current master 12C transmits the DEFSLVS command for instructing the device information to be shared to all the secondary masters 12S joining in the bus IF 11. Through this process, the updated device information is shared with the secondary master 12S and then the process ends.

In the bus IF 11, when the exit of the I3C device is confirmed, the reset of the group address can be performed by the procedure to be described above.

Note that as the exit of the I3C device is confirmed, in place of resetting the group address, for example, the current master 12C may perform the re-set of the group address. Through this process, communication can be performed by using the re-set group address and setting the group to a destination.

Alternatively, as the exit of the I3C device is confirmed, in place of resetting the group address, for example, the current master 12C excludes the group address assigned to the exited I3C device and then may continue to use the group address assigned to the remaining I3C devices. That is, in this case, communication can be directly performed setting the group to a destination by using the group address less affected by the exit of the I3C device.

<Format Example of RSTGRPA Command>

Figure 6:
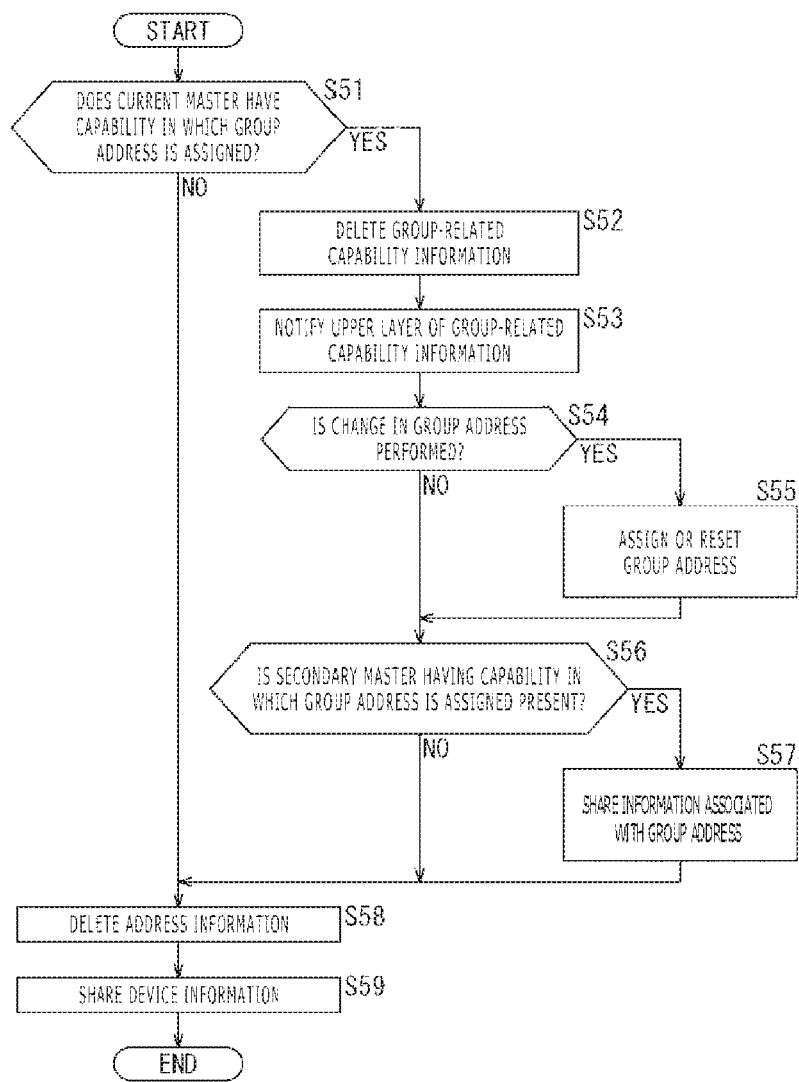
FIG. 6 is a flowchart describing a process at the time when an I3C device exits.
Figure 7:
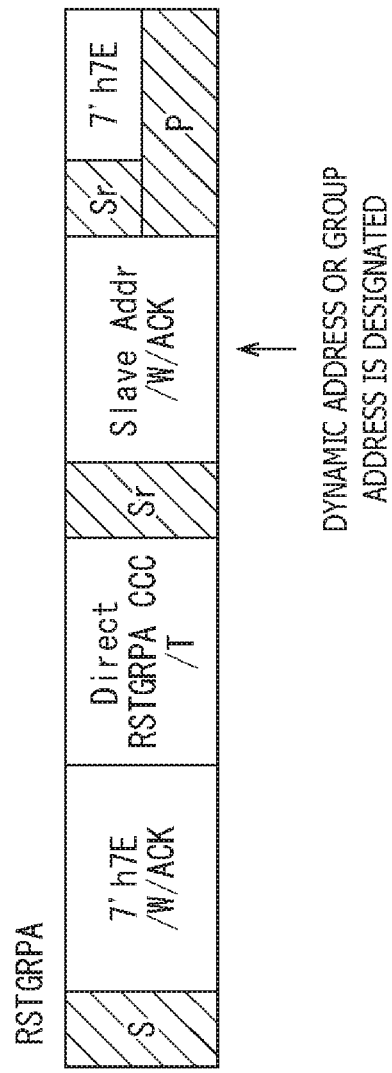
FIG. 7 is a diagram illustrating a first format example of a RSTGRPA command.

In FIG. 7, a first format example of the RSTGRPA command transmitted in Step S55 of FIG. 6 is illustrated.

The RSTGRPA command (Direct Write CCC) instructs the group address to be reset to one I3C device designated by the dynamic address or a plurality of I3C devices belonging to the group designated by the group address.

In the example illustrated in FIG. 7, first, the current master 12C issues a start condition (S), transmits the address 7'h7E for designating all the devices joining in the bus IF 11, and continuously transmits a common command code (Direct RSTGRPA CCC) for instructing the group address to be reset. Then, when the current master 12C transmits a slave address (Slave Address) in the wake of a restart (Sr), the I3C slave 13 of the slave address resets the group address. At this time, the slave address can designate the dynamic address or the group address.

Then, when the group address is not assigned, the device that receives the RSTGRPA command and has the group-belonging capability performs the ACK response but performs nothing, and when the group address is assigned, performs the ACK response and resets the group address of the device itself.

On the other hand, even if receiving the RSTGRPA command, the device having no group-belonging capability may neglect the RSTGRPA command; further, performs only the ACK response and subsequently may perform nothing. In the standard of I3C_v1.0, for example, the device that receives the direct common command code (Direct CCC) not to be supported is regulated to perform the NACK response. Since the RSTGRPA command is not regulated in the standard of I3C_v1.0, the device conforming to I3C_v1.0 necessarily performs the NACK response to the RSTGRPA command.

Meanwhile, a mechanism in which the set group address is re-set or cleared, for example, by a method using the RSTGRPA command as illustrated in FIG. 7 or the like is required for the master 12 having the capability in which the group address is assigned. On the other hand, the master 12 having no capability in which the group address is assigned arbitrarily transmits the RSTGRPA command as illustrated in FIG. 7.

Figure 8:
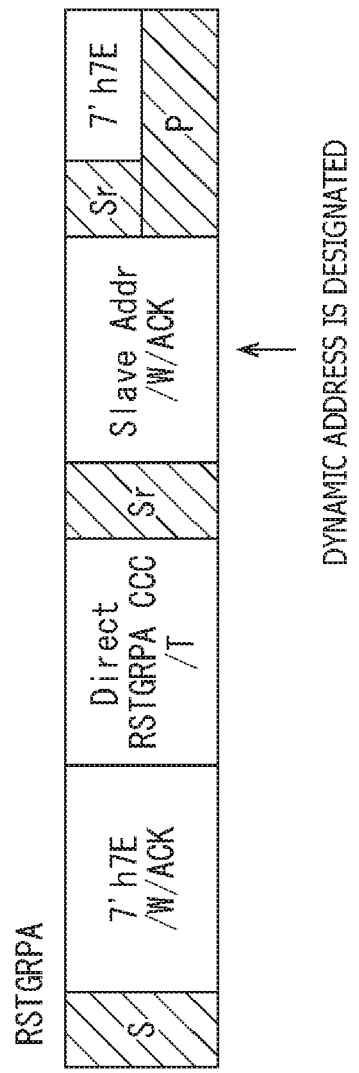
FIG. 8 is a diagram illustrating a second format example of a RSTGRPA command.

In FIG. 8, a second format example of the RSTGRPA command is illustrated.

When at least one or more of the group addresses are assigned to one I3C slave 13, the RSTGRPA command illustrated in FIG. 8 is used at the time of resetting their group addresses. In this case, only the dynamic address can be designated to the slave address.

Then, when one or more of the group addresses are assigned, the device that receives the RSTGRPA command and has the group-belonging capability resets all the group addresses of the device itself.

Note that when a plurality of group addresses are desired to be individually deleted, information can be overwritten by using the SETGRPA command.

By using the RSTGRPA command of the format to be described above, the current master 12C can reset the once-assigned group address to the I3C devices joining in the bus IF 11.

<Communication Format Using Group Address>

The communication format used in the communication using the group address will be described with reference to FIG. 9 to FIG. 11.

In FIG. 9, an example of the communication format in the write transfer (I3C Directed CCC Write) is illustrated.

As illustrated in FIG. 9, the ACK is sent back from the I3C slave 13 to the group address (I3C Group Address) transmitted from the current master 12C setting to the destination a plurality of arbitrary I3C slaves 13, and then data (Optional Write Data) written setting the group to a target is transmitted. Then, transmission of the data in which the group address is set to the destination is performed for the necessary data amount.

Note that when multiple I3C slaves 13 send back the ACK and a portion of the I3C slaves 13 transmit the NACK among the plurality of I3C slaves 13 belonging to the same group, the current master 12C is also assumed to be incapable of recognizing the NACK but normal communication can be performed by performing correspondence using the error detection in subsequent communication processing.

Figure 10:
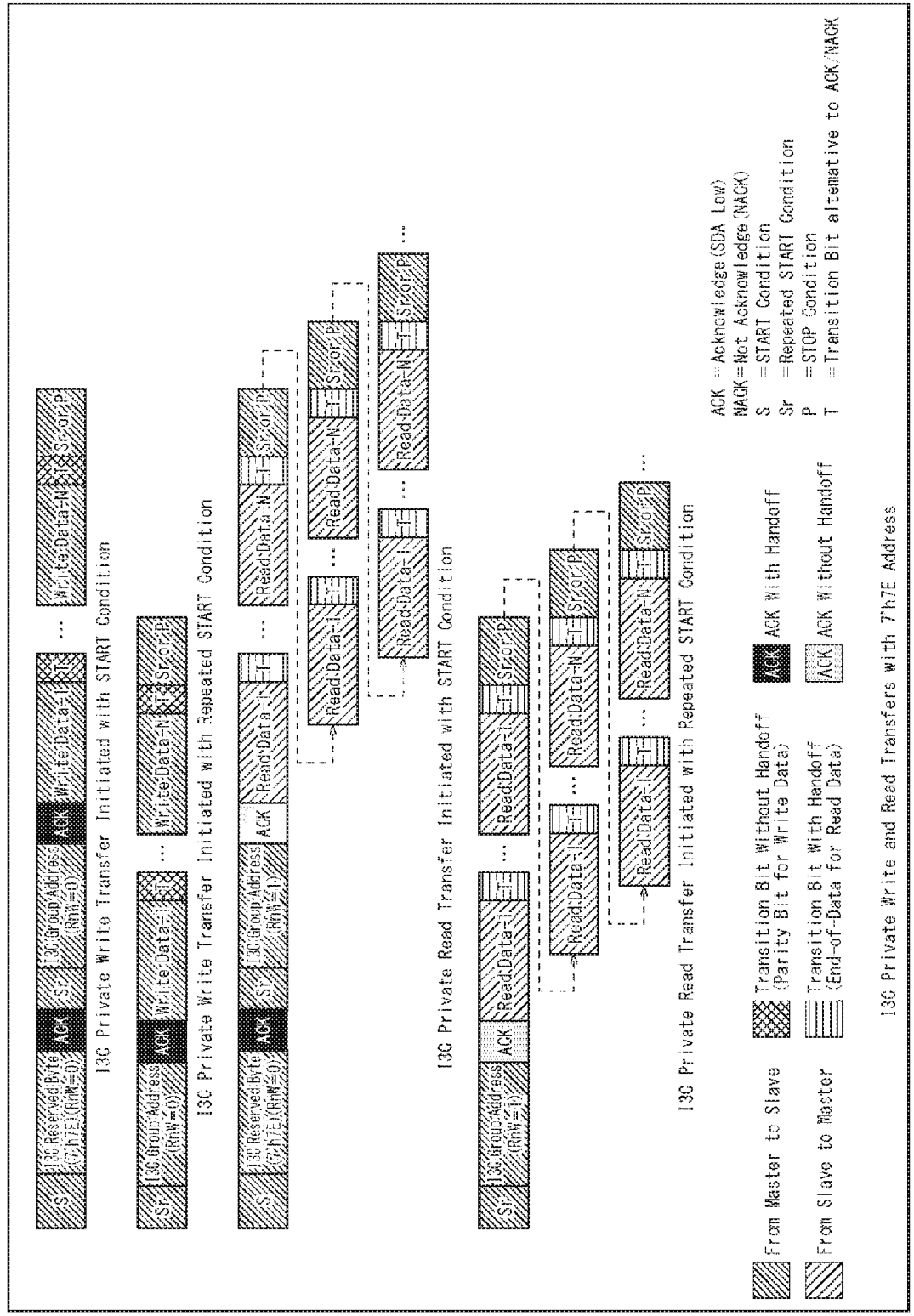
FIG. 10 is a diagram illustrating an example of a communication format in the write transfer and a readout transfer.

In FIG. 10, an example of the communication format in the write transfer (I3C Private Write) and the readout transfer (I3C Private Read) is illustrated.

Among four communication formats illustrated in FIG. 10, two communication formats on the upper side represent those in the write transfer and two communication formats on the lower side represent those in the write transfer.

In the write transfer, the ACK is sent back from the I3C slave 13 to the group address (I3C Group Address) transmitted from the current master 12C setting to the destination the plurality of arbitrary I3C slaves 13 and then N pieces of data (Write Data-1 to Write Data-N) written setting the group to a target are transmitted.

In the readout transfer, with regard to the plurality of I3C slaves 13 belonging to the same group, N pieces of data (Read Data-1 to Read Data-N) are sequentially read out from respective I3C slaves 13. That is, the data read out from the plurality of I3C slaves 13 needs to be controlled so that a conflict is prevented from occurring and a timing at which the data is read out from the respective I3C slaves 13 is different from each other.

In FIG. 11, an example of the communication format in the write transfer (I3C Private Write) and the readout transfer (13C Private Read) is illustrated.

In the similar manner as in the communication format illustrated in FIG. 10, in the write transfer, N pieces of data written setting the group to a target are transmitted and in the readout transfer, N pieces of data are sequentially read out for each I3C slave 13 of the same group.

In the group address (I3C Group Address) after the start condition (only S is included and Sr is not included), for example, the data transfer is performed at about 400 kHz by the open drain output from the current master 12C side. At this time, with regard to only a first one byte, the data transfer is performed by the open drain output and, with regard to subsequent bits (6 bit+R/W), the data transfer may be performed at 12.5 MHz by a push-pull output.

<Configuration Example of Computer>

Note that the respective processes described with reference to the above flowcharts are not necessarily executed in time series according to sequences described in the flowchart, but include processes (for example, parallel processes or processes by an object) that are executed in parallel or individually. In addition, a program may be processed by a single CPU or may be processed by a plurality of CPUs in a distributed manner.

In addition, the series of processes (communication method) described above can be executed by hardware or can be executed by software. When the series of processes are executed by the software, a program constituting the software is installed in a computer embedded in dedicated hardware or installed in, for example, a general-purpose personal computer in which various programs can be installed to execute various functions from a program recording medium in which a program is recorded.

Figure 12:
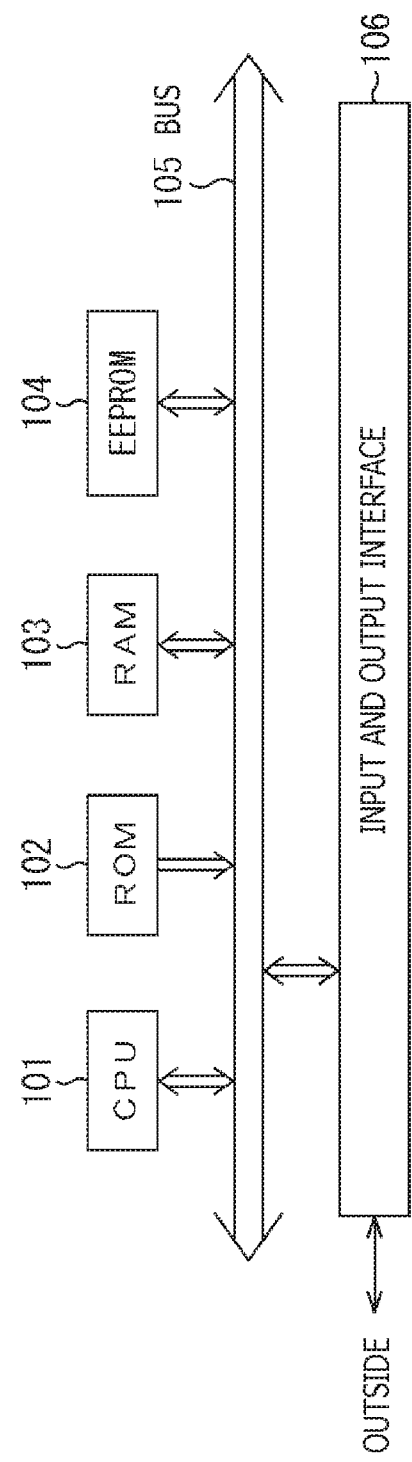
FIG. 12 is a block diagram illustrating a configuration example of an embodiment of a computer to which the present technology is applied.

FIG. 12 is a block diagram illustrating a configuration example (an example of a processing execution unit that executes the process executed by the master 12) of hardware of the computer that executes the series of processes described above by programs.

In the computer, a CPU (Central Processing Unit) 101, a ROM (Read Only Memory) 102, a RAM (Random Access Memory) 103, and an EEPROM (Electronically Erasable and Programmable Read Only Memory) 104 are connected to each other through a bus 105. An input and output interface 106 is further connected to the bus 105 and the input and output interface 106 is connected to the outside (for example, the data signal line 14 and the clock signal line 15 of FIG. 1).

In the computer configured as described above, the CPU 101 loads and executes the program stored in, for example, the ROM 102 and the EEPROM 104, in the RAM 103 through the bus 105, and thus the series of processes described above are executed. In addition, the program executed by the computer (CPU 101) may be written in advance in the ROM 102, or installed and updated in the EEPROM 104 from the outside through the input and output interface 105.

<Combination Example of Configuration>

In addition, the present technology may also take the following configurations.

(1)

A communication device having a communication initiative through a bus, including:

a transmission and reception control unit configured to control transmission and reception of a signal with another communication device that performs communication under control of the communication device: and a processing execution unit configured to execute a process for assigning a group address to another arbitrary communication device of a plurality of the other communication devices joining in the bus setting a plurality of the other arbitrary communication devices to one group and setting the group to a destination, and a process for resetting the group address assigned to the other remaining communication devices of the other communication devices to which the group address is assigned when it is confirmed that at least one or more of the other communication devices exit from the bus.

(2)

The communication device according to the above (1), in which the processing execution unit executes a process for recognizing whether or not the other communication device has a group-belonging capability capable of belonging to the group and performing communication after permitting a hot join request for requesting the other communication device to join halfway in a state in which the bus is operated, and a process for assigning the group address to the other communication device recognized to have the group-belonging capability.

(3)

The communication device according to the above (2), in which another particular communication device that is capable of functioning as the communication device when the communication initiative is transferred from the communication device and that performs communication under control of the communication device when having no communication initiative can join in the bus, and the processing execution unit executes a process for sharing information associated with the other communication device with the other particular communication device.

(4)

The communication device according to the above (3), in which as the group address is assigned to the other communication device, the processing execution unit shares the group-belonging capability and the group address of the other communication device with the other particular communication device.

(5)

The communication device according to the above (3), in which as it is confirmed that the other communication device exits from the bus, the processing execution unit shares a reset of the group-belonging capability and the group address of the other communication device with the other particular communication device.

(6)

The communication device according to any of (1) to (5), in which as it is confirmed that the other communication device exits from the bus, the processing execution unit performs a re-set of the group address in place of resetting the group address.

(7)

The communication device according to any of (1) to (6), in which as the other communication device exits from the bus, in place of resetting the group address, the processing execution unit excludes the group address assigned to the other exited communication device and then continues to use the group address assigned to the other remaining communication devices.

(8)

A communication method performed by a communication device having a communication initiative through a bus, including the steps of:

controlling transmission and reception of a signal with another communication device that performs communication under control of the communication device;

assigning a group address to another arbitrary communication device of a plurality of the other communication devices joining in the bus setting a plurality of the other arbitrary communication devices to one group and setting the group to a destination; and resetting the group address assigned to the other remaining communication devices of the other communication devices to which the group address is assigned when it is confirmed that at least one or more of the other communication devices exit from the bus.

(9)

A program for causing a computer built in a communication device having a communication initiative through a bus to execute a process including the steps of:

controlling transmission and reception of a signal with another communication device that performs communication under control of the communication device;

assigning a group address to another arbitrary communication device of a plurality of the other communication devices joining in the bus setting a plurality of the other arbitrary communication devices to one group and setting the group to a destination; and resetting the group address assigned to the other remaining communication devices of the other communication devices to which the group address is assigned when it is confirmed that at least one or more of the other communication devices exit from the bus.

(10)

A communication system in which communication is performed by a communication device having a communication initiative through a bus and another communication device performing communication under control of the communication device, in which the communication device includes a transmission and reception control unit configured to control transmission and reception of a signal with another communication device that performs communication under control of the communication device, and a processing execution unit configured to execute a process for assigning a group address to another arbitrary communication device of a plurality of the other communication devices joining in the bus setting a plurality of the other arbitrary communication devices to one group and setting the group to a destination, and a process for resetting the group address assigned to the other remaining communication devices of the other communication devices to which the group address is assigned when it is confirmed that at least one or more of the other communication devices exit from the bus.

Note that the present embodiment is not limited to the embodiment described above and various modifications can be made without departing from the spirit and scope of the present disclosure. Also, the effects described in the present specification are merely illustrative and are not limitative, and other effects may be described therein.

REFERENCE SIGNS LIST

11 Bus IF
12-1 to 12-3 Master
13-1 to 13-6 Slave
14 Data signal line
15 Clock signal line 21 Master device
22 Upper layer
31 Slave device
32 Upper layer
41 Transmission and reception control unit
42 Data reception unit
43 Data transmission unit
44 Mastership request control unit
45 Command interpretation unit
46 Information holding unit
47 Command transmission unit
48 Table holding unit
51 Transmission and reception control unit
52 Data reception unit
53 Data transmission unit
54 Hot join request control unit
55 Dynamic address holding unit
56 Group address holding unit
57 Command interpretation unit
58 Information holding unit

The invention claimed is:

1. A primary communication device having a communication initiative through a bus, the primary communication device comprising:
communication circuitry configured to
communicate with a plurality of secondary communication devices, the plurality of secondary communication devices configured to communicate under control of the primary communication device that uses one or more assigned group addresses, and
receive a hot-join request from one or more external communication devices to join the plurality of secondary communication devices; and
control circuitry configured to
control the communication circuitry to output an acknowledgement of the hot-join request to the one or more external communication devices,
assign a dynamic address to each of the one or more external communication devices,
control the communication circuitry to output an instruction to acquire group-related capability information from the each of the one or more external communication devices, and
assign a group address to each of the one or more external communication devices based on the group-related capability information that is acquired from the each of the one or more external communication devices.

2. The primary communication device according to claim 1, wherein the control circuitry is further configured to determine whether at least one of the plurality of secondary communication devices has a communication initiative capability and a capability relating to a group address.

3. The primary communication device according to claim 2, wherein responsive to determining that the at least one of the plurality of secondary communication devices has the communication initiative capability and the capability relating to the group address, the control circuitry is further configured to control the communication circuitry to communicate the one or more assigned group addresses to the at least one of the plurality of secondary communication devices.

4. The primary communication device according to claim 1, wherein the control circuitry is further configured to determine whether at least one of the one or more external communication devices has a communication initiative capability and a capability relating to a group address.

5. The primary communication device according to claim 4, wherein responsive to determining that the at least one of the one or more external communication devices has the communication initiative capability and the assignment of group addresses capability, the control circuitry is further configured to control the communication circuitry to communicate the one or more assigned group addresses to the at least one of the one or more external communication devices.

6. The primary communication device according to claim 1, wherein the control circuitry is further configured to control the communication circuitry to output a read command that does not include the group address.

7. The primary communication device according to claim 1, wherein the group-related capability information acquired from the each of the one or more external communication devices includes an I3C version state.

8. The primary communication device according to claim 1, wherein the group-related capability information acquired from the each of the one or more external communication devices includes information representing a number of assignable group address slots of the each of the one or more external communication devices.

9. The primary communication device according to claim 1, further comprising a semiconductor integrated circuit, the semiconductor integrated circuit including at least one of the communication circuitry or the control circuitry.

10. The primary communication device according to claim 1, wherein the control circuitry is further configured to control the communication circuitry to output a write command to a portion of the plurality of secondary communication devices that has a common group address.

11. The primary communication device according to claim 10, wherein the communication circuitry is further configured to receive an acknowledgment from the portion of the plurality of secondary communication devices that has the common group address in response to the output of the write command.

12. A communication system comprising:
one or more external communication devices;
a primary communication device having a communication initiative through a bus; and
a plurality of secondary communication devices configured to perform communication through the bus under control of the primary communication device that uses one or more assigned group addresses,
the primary communication device including
communication circuitry configured to
communicate with the plurality of secondary communication devices, and
receive a hot-join request from the one or more external communication devices to join the plurality of secondary communication devices; and
control circuitry configured to
control the communication circuitry to output an acknowledgement of the hot-join request to the one or more external communication devices,
assign a dynamic address to each of the one or more external communication devices,
control the communication circuitry to output an instruction to acquire group-related capability information from the each of the one or more external communication devices, and
assign a group address to each of the one or more external communication devices based on the group-related capability information that is acquired from the each of the one or more external communication devices.

13. The communication system according to claim 12, wherein the control circuitry is further configured to determine whether at least one of the plurality of secondary communication devices has a communication initiative capability and a capability relating to a group address.

14. The communication system according to claim 13, wherein responsive to determining that the at least one of the plurality of secondary communication devices has the communication initiative capability and the capability relating to the group address, the control circuitry is further configured to control the communication circuitry to communicate the one or more assigned group addresses to the at least one of the plurality of secondary communication devices.

15. The communication system according to claim 12, wherein the control circuitry is further configured to determine whether at least one of the one or more external communication devices has a communication initiative capability and a capability relating to a group address.

16. The communication system according to claim 15, wherein responsive to determining that the at least one of the one or more external communication devices has the communication initiative capability and the assignment of group addresses capability, the control circuitry is further configured to control the communication circuitry to communicate the one or more assigned group addresses to the at least one of the one or more external communication devices.

17. A primary communication device having a communication initiative through a bus, the primary communication device comprising:
communication circuitry configured to
communicate with a plurality of secondary communication devices, the plurality of secondary communication devices configured to communicate under control of the primary communication device using one or more assigned group addresses; and
control circuitry configured to
determine whether at least one of the plurality of secondary communication devices has a communication initiative capability and a capability relating to a group address, and
responsive to determining that the at least one of the plurality of secondary communication devices has the communication initiative capability and the assignment of group addresses capability, the control circuitry is further configured to control the communication circuitry to communicate information associated with the one or more assigned group addresses to the at least one of the plurality of secondary communication devices.

18. The primary communication device according to claim 17, wherein responsive to determining that the at least one of the plurality of secondary communication devices has the communication initiative through the bus and the capability to assign group addresses, the control circuitry is further configured to control the communication circuitry to communicate device information to the at least one of the plurality of secondary communication devices.

19. The primary communication device according to claim 17, wherein the control circuitry is further configured to
assign the one or more assigned group addresses to the plurality of secondary communication devices, and
assign a second one or more assigned group addresses to the plurality of secondary communication devices in place of the one or more assigned group addresses, the second one or more assigned group addresses being different form the one or more assigned group addresses.

20. The primary communication device according to claim 19, wherein the control circuitry is further configured to
detect that one of the plurality of secondary communication devices is being disconnected from the bus, and
generate the second or more assigned group addresses in response to detecting that the one of the plurality of secondary communication devices is being disconnected from the bus.

21. The primary communication device according to claim 17, wherein the control circuitry is further configured to
detect that one of the plurality of secondary communication devices is being disconnected from the bus, and
share a reset of a group-related capability information and corresponding group address of the one of the plurality of secondary communication devices that is being disconnected from the bus with the at least one of the plurality of secondary communication devices having the communication initiative capability and the assignment of group addresses capability.

22. A secondary communication device comprising:
communication circuitry configured to
communicate with a primary communication device and one or more tertiary communication devices through a bus, the secondary communication device and the one or more tertiary communication devices are under control of the primary communication device that uses one or more assigned group addresses,
receive information associated with a second one or more assigned group addresses from the primary communication device in response to one of the one or more tertiary communication devices being connected or disconnected from the bus; and
control circuitry configured to
store the second one or more assigned group addresses, wherein the secondary communication device has a communication initiative capability and a capability relating to a group address.

* * * * *